Figure 1:
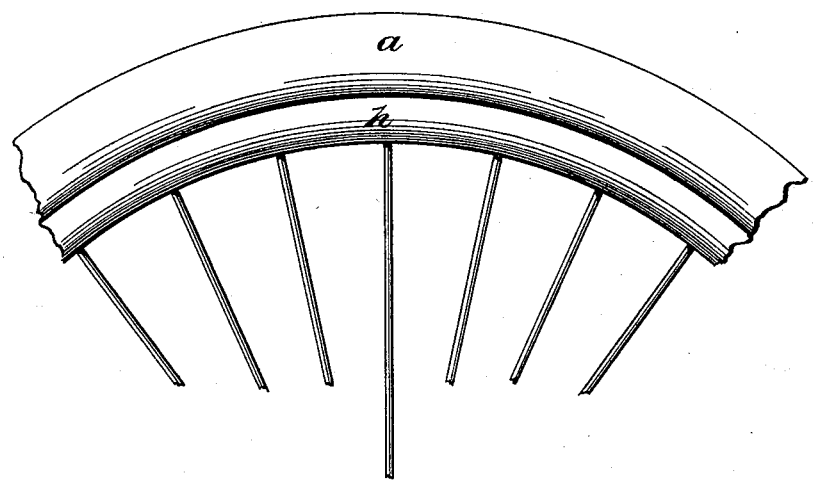

(No Model.)

C. K. WELCH.
RUBBER TIRE.

No. 522,138. Patented June 26, 1894.

Witnesses.
Robert Emmett
Thos. A. Green

Inventor:
Charles K. Welch,
By James L. Norris.
Atty.

UNITED STATES PATENT OFFICE.

CHARLES KINGSTON WELCH, OF LONDON, ENGLAND.

RUBBER TIRE.

SPECIFICATION forming part of Letters Patent No. 522,138, dated June 26, 1894.

Application filed February 13, 1892. Serial No. 421,441. (No model.) Patented in England September 16, 1890, No. 14,563; in France February 5, 1892, No. 219,167; in Belgium February 5, 1892, No. 98,225; in Canada October 11, 1892, No. 40,630; in Denmark November 16, 1892, No. 3,318; in South Australia November 21, 1892, No. 2,360; in Victoria November 22, 1892, No. 10,155; in New South Wales November 23, 1892, No. 4,135; in Queensland November 24, 1892, No. 2,244; in New Zealand February 1, 1893, No. 6,019; in Austria-Hungary April 22, 1893, No. 43 and No, 1,156, and in Italy October 18, 1893, XXVII, 32,810.

*To all whom it may concern:*

Be it known that I, CHARLES KINGSTON WELCH, engineer, a subject of the Queen of Great Britain, residing at Coventry, England, have invented certain new and useful Improvements in Tires for Vehicles, (for which I have obtained patents in Great Britain, No. 14,563, dated September 16, 1890; in France, No. 219,167, dated February 5, 1892: in Belgium, No. 98,225, dated February 5, 1892; in Austria-Hungary, Tom. 43, Fol. 1,156, dated April 22, 1893; in Italy, Vol. XXVII, No. 32,810, dated October 18, 1893; in Denmark, No. 3,318 / 111, dated November 16, 1892; in Canada, No. 40,630, dated October 11, 1892; in Victoria, No. 10,155, dated November 22, 1892; in New South Wales, No. 4,135, dated November 23, 1892; in South Australia, No. 2,360, dated November 21, 1892; in New Zealand, No. 6,019, dated February 1, 1893, and in Queensland, No. 2,244, dated November 24, 1892,) of which the following is a specification, reference being had to the drawings accompanying and forming part of the same.

Heretofore pneumatic tires have been made with an inner air tight tube and an outer jacket or cover and secured to the rim of a wheel by wires drawn taut around the rim and acting to clamp or bind the said cover to the rim. In other forms of tire the wires instead of serving as clamps to bind the tire or its cover to the rim have been made endless or have had their ends connected together either directly or indirectly, so that their length or circumference was somewhat less than that of the edges of a grooved rim with which the tire was associated. In the latter form of tire the union of tire and rim is directly due to the internal air pressure of the inflated tire acting upon the cover outwardly and laterally, the strain being borne by the non-extensible wires the divergent sides of the grooved rim which confine the wired edges serving mainly to limit their lateral displacement. The wires in this case serve merely as non-extensible circumferential reinforcements, and from the conditions of their special application must lie below the edges of the rim.

My invention resides in a modified and improved tire embodying this principle of construction, the general character of said improvements being that the reinforcing wires instead of lying within the groove or grooves, are located outside of the same, so that the rim serves merely as a seat for that portion of the tire nearest the rim; but since in my tire the wires are not contained in the seating groove, other means must be provided for preventing or limiting their tendency to lateral displacement and the invention involves a means for accomplishing this as one of its essential elements.

Broadly stated the invention consists in the combination with the grooved rim of an inflatable tube seated therein, a jacket or cover surrounding the said tube and provided with reinforced or wired sides lying outside the rim and means for preventing the lateral displacement of the reinforced sides with respect to the rim.

From the nature of the invention, as will be hereinafter more fully understood, it is immaterial whether the wires be endless, or whether their ends be connected together directly or indirectly provided they fulfill the requisite function of circumferential reinforcements. It is also unnecessary that the reinforcing wires, or wired side of the jacket should be clamped or secured to any portion of the rim.

In the description and claims which follow, I use the term reinforcing wires to distinguish them from those wires heretofore used and which served merely as clamps to bind the tire cover to the rim.

I have illustrated in the accompanying drawings the invention in the form devised by me.

Figure 2:
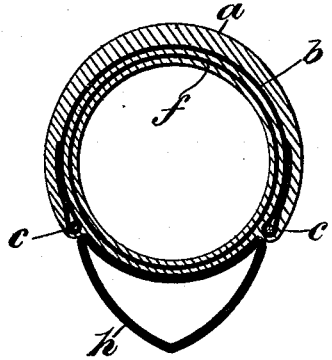

Figure 1 is a side view of a portion of a wheel rim and tire. Fig. 2 is a cross section of the same.

In the figures, *a* is the outer shoe layer of rubber having a lining of canvas *b*, which is folded back upon itself to form continuous annular loops forming spaces for the wires *c*, *c*. The rubber *a* and canvas *b* constitute the cover or jacket. The inner inflatable tube is designated by the letter *f*. Each of the wires *c, c,* may be made continuous by brazing the ends together or the ends may be united by means of a nipple or other suitable device. Or a number of coils may be used, formed of one continuous wire or several wires grouped together, the ends being united by brazing. I may also use for reinforcing the sides of the jacket a core or cores made of other suitable material instead of metal cores. All these cores are hereinafter included in the word "wire."

The tire is applied to a rim *h* having an exterior groove or seat. The wires *c* are located outside the grooved rim as shown.

If the tire be deflated it may be placed on the rim as shown in Fig. 2. When the inner tube is inflated the air pressure against the inside of the jacket puts a strain equally all round the tire upon the reinforced or wired sides. These being non-extensible cannot increase in circumference, so that to maintain the confining chamber in place it is only necessary to prevent the wires from lateral displacement away from the rim *h*. This I do by uniting the jacket to the inner tube as by vulcanizing the two together.

What I claim is—

1. The combination with a grooved rim, of an inflatable tube, an outer jacket forming a confining chamber for the inflatable tube, reinforcing wires secured to or incorporated with the sides of said jacket, said wires being of greater diameter than the greatest diameter of the rim so as to lie above and along the edges of the same, and secured against lateral displacement with respect thereto.

2. The combination with a grooved rim, of an inflatable tube, an outer jacket forming a confining chamber for said tube, and wires or reinforcements at its sides of greater diameter than the greatest diameter of the rim, said reinforced portions lying in contact with the edges of the rim, but outside the groove therein, and means for securing said wires from being displaced laterally from the rim, as set forth.

3. The combination with a grooved rim, of an inflatable tube, an outer jacket having wires or reinforced portions lying outside the groove along the edges of the same and being united with said tube, as set forth.

Dated January 21, 1892.

CHARLES KINGSTON WELCH.

Witnesses:
GEORGE C. DOWNING,
8 *Quality Court, London, W. C.*
JOSEPH LAKE,
17 *Gracechurch Street, London, E. C.*